(12) United States Patent
Harter et al.

(10) Patent No.: US 8,070,431 B2
(45) Date of Patent: Dec. 6, 2011

(54) FULLY CONTAINED RETENTION PIN FOR A TURBINE NOZZLE

(75) Inventors: Ariel K. Harter, Simpsonville, SC (US); Edward D. Benjamin, Simpsonville, SC (US); Daniel D. Snook, Moore, SC (US); David J. Humanchuk, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1022 days.

(21) Appl. No.: 11/931,320

(22) Filed: Oct. 31, 2007

(65) Prior Publication Data

US 2009/0110479 A1    Apr. 30, 2009

(51) Int. Cl.
*F01D 9/02* (2006.01)
(52) U.S. Cl. .................................. 415/209.3; 415/213.1
(58) Field of Classification Search ............... 415/209.2, 415/209.3, 213.1
See application file for complete search history.

(56) References Cited

U.S. PATENT DOCUMENTS

| | | | |
|---|---|---|---|
| 3,606,410 A * | 9/1971 | Inserra | 403/13 |
| 4,411,544 A * | 10/1983 | Gallman | 402/69 |
| 5,176,496 A | 1/1993 | Correia et al. | |
| 5,459,995 A | 10/1995 | Norton et al. | |
| 5,839,878 A * | 11/1998 | Maier | 415/209.2 |
| 6,537,023 B1 | 3/2003 | Aksit et al. | |
| 7,037,071 B2 * | 5/2006 | Antunes et al. | 415/189 |
| 7,094,025 B2 * | 8/2006 | Arness et al. | 415/189 |
| 7,850,425 B2 * | 12/2010 | Snook et al. | 415/209.3 |

* cited by examiner

*Primary Examiner* — Ninh H Nguyen
(74) *Attorney, Agent, or Firm* — Dority & Manning, P.A.

(57) ABSTRACT

A retention pin for fastening retaining lugs of an outer sidewall, of a turbine nozzle, within a groove between a forward land and an aft land of a retaining ring. The retention pins fit through coaxial holes in the lug and the lands, securing the radial and circumferential location of the nozzles as well as allowing transitional motion. While maintaining limited contact with both the nozzles and the retaining ring they significantly reduce conductive heat transfer from the nozzle to the retaining ring. By positioning the nozzles, they also set the desired nozzle throat areas for targeted turbine performance. The pins have been designed such that the nozzle cannot disengage within the assembly due to the pin backing out of its nominal axial position, and the pin will not fail due to low cycle fatigue, creep, or yielding, all of which prevent nozzle fallout.

21 Claims, 10 Drawing Sheets

FULLY CONTAINED RETENTION PIN FOR A TURBINE NOZZLE

RELATED APPLICATIONS

This application is related to application Ser. No. 11,836,865 Outer Sidewall Retention Scheme For A Singlet Turbine Nozzle filed on Aug. 10, 2007 and assigned to the General Electric Company.

BACKGROUND OF THE INVENTION

The invention relates generally to a retention pin for a gas turbine nozzle and more specifically to a fully contained retention pin for an outer sidewall retention scheme for a nozzle.

In a gas turbine, hot gases of combustion flow from combustors through first-stage nozzles and buckets and through the nozzles and buckets of follow-on turbine stages. The first-stage nozzles typically include an annular array or assemblage of cast nozzle segments each containing one or more nozzle stator vanes per segment. Each first-stage nozzle segment also includes inner and outer sidewall portions spaced radially from one another. Upon assembly of the nozzle segments, the stator vanes are circumferentially spaced from one another to form an annular array thereof between annular inner and outer sidewalls. A nozzle retaining ring coupled to the outer sidewall of the first-stage nozzles supports the first-stage nozzles in the gas flow path of the turbine. An annular nozzle support ring, preferably split at a horizontal midline, is engaged by the inner sidewall and may support the first-stage nozzles against axial movement.

Side seals may seal the annular array of segments one to the other along adjoining circumferential edges. The side seals seal between a high pressure region radially inwardly of the inner sidewall and radially outward of the outer sidewall, i.e., compressor discharge air at high pressure, and the hot gases of combustion in the hot gas flow path which are at a lower pressure. Chordal hinge seals are used to seal between the inner sidewall of the first-stage nozzles and an axially facing surface of the nozzle support ring and between the outer sidewall and a shroud for the first stage bucket.

Figure 1:
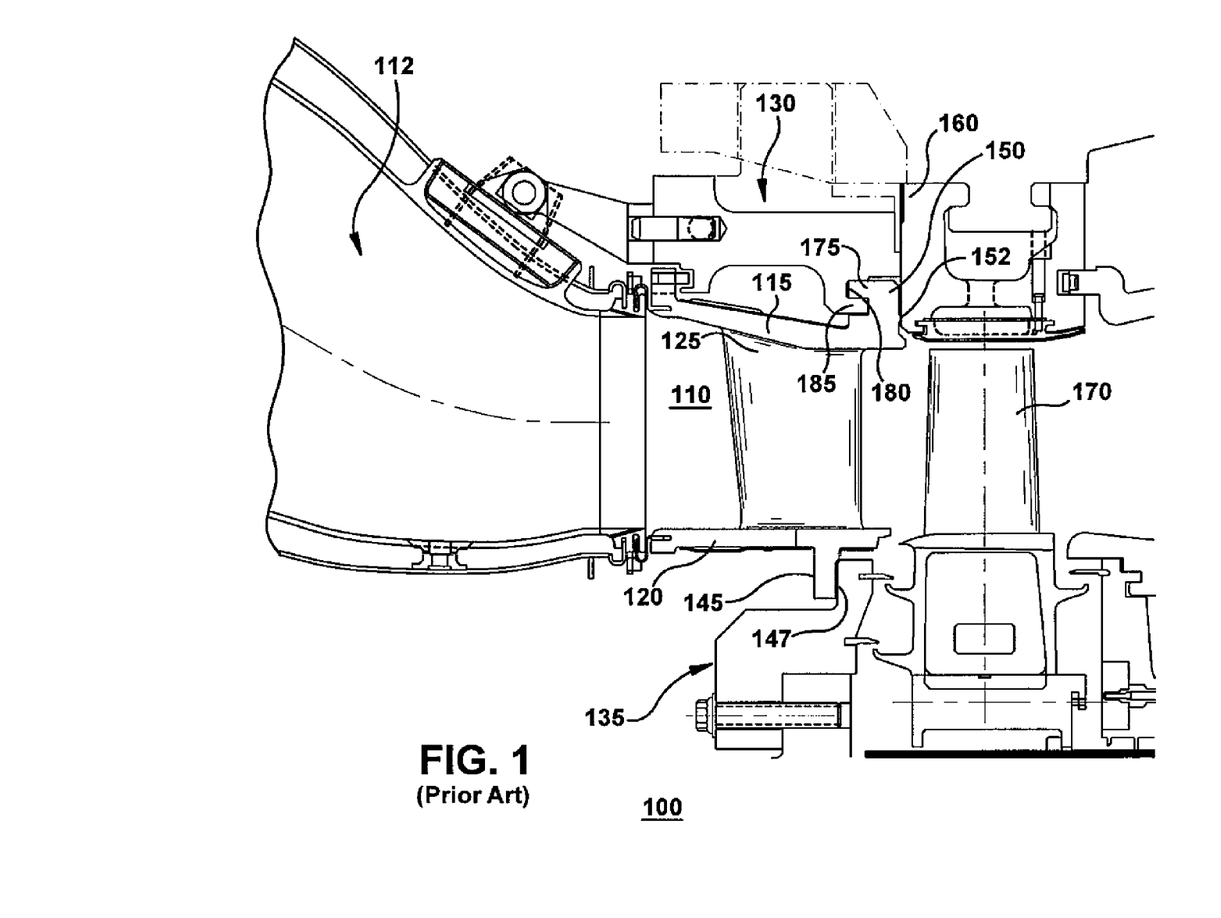
FIG. 1 illustrates a typical sidewall retention scheme first stage nozzle employing a hook retention scheme for the outer sidewall in a prior art gas turbine.

FIG. 1 illustrates a prior art sidewall retention system 100 for a first stage nozzle 110. The first stage nozzle 110 includes an outer sidewall 115, an inner sidewall 120 and an airfoil 125 positioned between a nozzle retaining ring 130 and a nozzle support ring 135. The nozzle retaining ring 130 and the support ring 135 are attached to the casing of the turbine (not shown). The first stage nozzle also includes chordal hinge rails for the inner sidewall and outer sidewall. The chordal hinge rail 145 on the inner sidewall 120 provides axial support for the nozzle 110 against the support ring 135 and the chordal hinge rail 150 provides axial support for the nozzle 110 against the shroud 160 of the first stage bucket 170. The inner chordal hinge rail 145 and outer chordal hinge rail 150 further provide chordal hinge seals 147, 152.

The chordal hinge rail 150 on the outer sidewall 115 of the nozzle 110 projects outward radially from the outer sidewall 115. The chordal hinge rail 150 incorporates a forward-facing annular retaining land 175 at its outermost radial projection. The retaining land 175 mates with an aft-facing annular groove 180 established by an aft-facing retaining hook 185 on the retaining ring. The retaining land 175 of the chordal hinge rail 150 acting on the retaining hook 185 of the retaining ring 130 provides radial support for the nozzle 110. The annular retaining hook 185 may be divided into segments (not shown). Circumferential support is provided by an anti-rotation pin (not shown) that passes through the retaining ring 130 and the retaining land 175.

Power generation gas turbines traditionally use some type of hook retention scheme. Improvements have been made on the traditional hook retention scheme by changing from a continuous hook arrangement, typical in FA class machines by the General Electric Company to a segmented hook arrangement, typical in FB class machines by General Electric Company. This change resulted in more determinate nozzle loading and better nozzle sealing but also resulted in poor thermal isolation of the retaining ring and thereby a substantial cost increase to the nozzle arrangement. Some of the field issues related to hook retention designs include poor chordal hinge sealing, retaining ring out of roundness, and high trailing edge stresses.

Accordingly, there is a need to provide determinate nozzle loading and improved sealing while also improving thermal isolation of the retaining ring, reducing cost, and improving assembly flexibility of the nozzle arrangement.

BRIEF DESCRIPTION OF THE INVENTION

The present invention relates to a retaining pin for retaining the outer sidewall of a first stage nozzle in a gas turbine.

Briefly in accordance with one aspect of the present invention, a retention pin is provided for fastening retaining lugs of an outer sidewall of a turbine nozzle, where the outer sidewall includes a chordal hinge. The retaining lugs are fastened within a groove between a forward land and an aft land of a retaining ring wherein the retention pins fit through coaxial holes in the lug and the lands. The retention pin includes a generally cylindrical-shaped pin. The pin includes an outer diameter adapted to fit through the coaxial holes in the lug and the lands. The pin also includes a length adapted to fit between a closed-end in the coaxial hole of the forward land and an inner wall of the chordal hinge rail.

In accordance with a second aspect of the present invention, a method is provided for fastening lugs of an outer sidewall, of a turbine nozzle, where the outer sidewall includes a chordal hinge. The retaining lugs are fastened within a groove between a forward land and an aft land of a retaining ring through coaxial holes in the lugs and the lands. The method includes providing guiding means on a tip end of the retention pin and engaging means on the tail end of the retention pin. The method further includes inserting the retention pin through the coaxial holes of the aft land of the retaining ring, the lug of the sidewall and forward land of the retaining ring. When the retention pin has been inserted, the pin is seated in the closed-end of the coaxial hole in the forward land of the retaining ring.

BRIEF DESCRIPTION OF THE DRAWING

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

The following embodiments of the present invention have many advantages, including improved nozzle stability, determinate nozzle loading, and improved retaining ring thermal isolation. The pin is unique to the retention scheme with respect to both dimensions and features and is critical to the functionality of the turbine assembly (2 per nozzle). The pins for each nozzle secure the radial and circumferential location of the nozzles as well as allow transitional motion. They also maintain minimal contact with both the nozzles and the retaining ring to significantly reduce conductive heat transfer from the nozzle to the retaining ring (the source of retaining ring out-of-roundness). By positioning the nozzles, they also set the desired nozzle throat areas for optimal turbine performance. The axial lengths for the pins have been optimized such that the nozzle cannot disengage within the assembly due to the pin backing out of its nominal axial position, and the pin has been designed such that the pin will not fail due to low cycle fatigue, creep, or yielding, all of which minimize nozzle fallout.

Power generation gas turbines traditionally use a hook retention scheme. Hook retention schemes inherently have several design drawbacks that cannot be overcome. The present invention overcomes the drawbacks of the hook design. An embodiment of the inventive design retains the first stage nozzle with two axially oriented pins. The benefits of this retention scheme include improved nozzle stability, determinate nozzle loading, airfoil trailing edge stress reduction, improved retaining ring thermal isolation, improved nozzle arrangement assembly flexibility, improved chordal hinge sealing, and improved nozzle castibility.

More specifically, the first stage nozzle is attached to the retaining ring at the outer sidewall with two axially oriented pins. Both pins are supported on each end in axially oriented pinholes in the retaining ring thereby being simply supported. One pin passes through a pinhole in a nozzle lug. A second pin passes through a slot in a nozzle lug. The slot is open to the pressure side of the nozzle. The first pin prevents the nozzle from translating in the radial and tangential directions. The second pin prevents the nozzle from rotating about the axial direction. Combined with the inner sidewall and outer sidewall chordal hinge rails, the result is a fully constrained, non-redundant retention system.

The lugs are positioned in such a way as to maximize nozzle stability, minimize stress input into life limiting features, i.e. the trailing edge, and to guarantee deterministic nozzle loads. The nozzle stability is maximized by moving the lugs as far forward as possible and as far apart as possible to generate longer moment arms for reacting out gas loads. Moving the support lugs away from the trailing edge minimizes the stress input into the trailing edge. The nozzle loads are made more deterministic by designing the retention features to only be capable of supporting loads in the designated directions. The inventive retention scheme also drastically reduces thermal input from the nozzle into the retention features in comparison to the original hook design. Minimizing the contact area and preventing dead cavities between the nozzle and the retention features accomplish this reduction. The retention scheme is designed for ease of assembly and reviewed with manufacturing. The retention scheme results in improved nozzle and retaining ring life, leakage reduction resulting in nitrogen oxide (Nox) reduction, and substantially lower nozzle arrangement cost relative to comparable technology engines.

The outer sidewall retention scheme for first stage singlet nozzles includes a circumferential retaining ring with a circumferential annular groove, a plurality of first stage nozzles each with an inner sidewall and an outer sidewall, a first lug and a second lug mounted on the outer sidewall of each nozzle, a first retention pin and a second retention pin, and a chordal hinge rail on the each sidewall for each nozzle. FIGS. 2A, 2B, 3A-3C, and 4 illustrate aspects of the outer sidewall retention scheme as disclosed in application Ser. No. 11,836,865 Outer Sidewall Retention Scheme For A Singlet Turbine Nozzle filed on Aug. 10, 2007 and assigned to the General Electric Company.

Figure 2A:
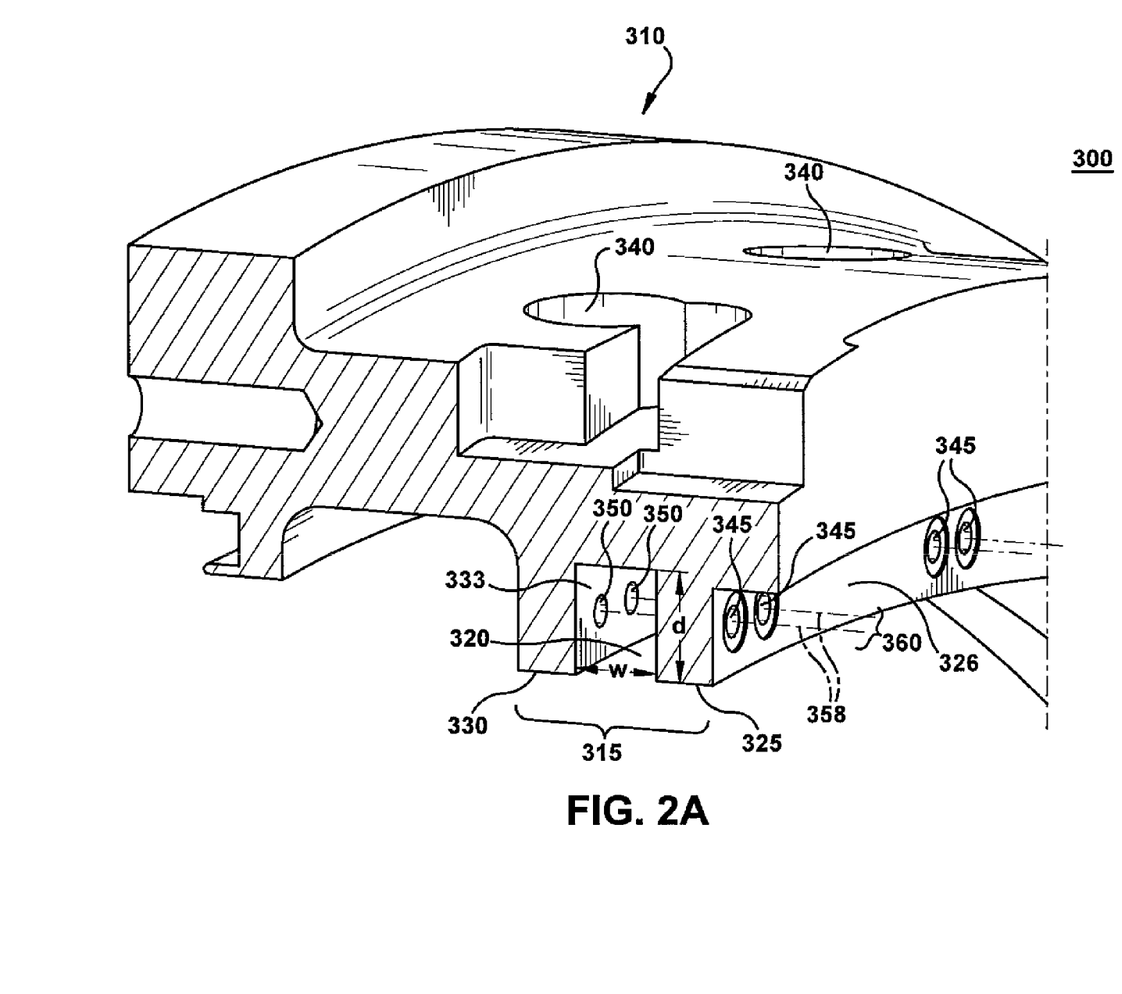
FIG. 2A and FIG. 2B illustrate an embodiment of an inventive retaining ring for the outer sidewall retention scheme.
Figure 2B:
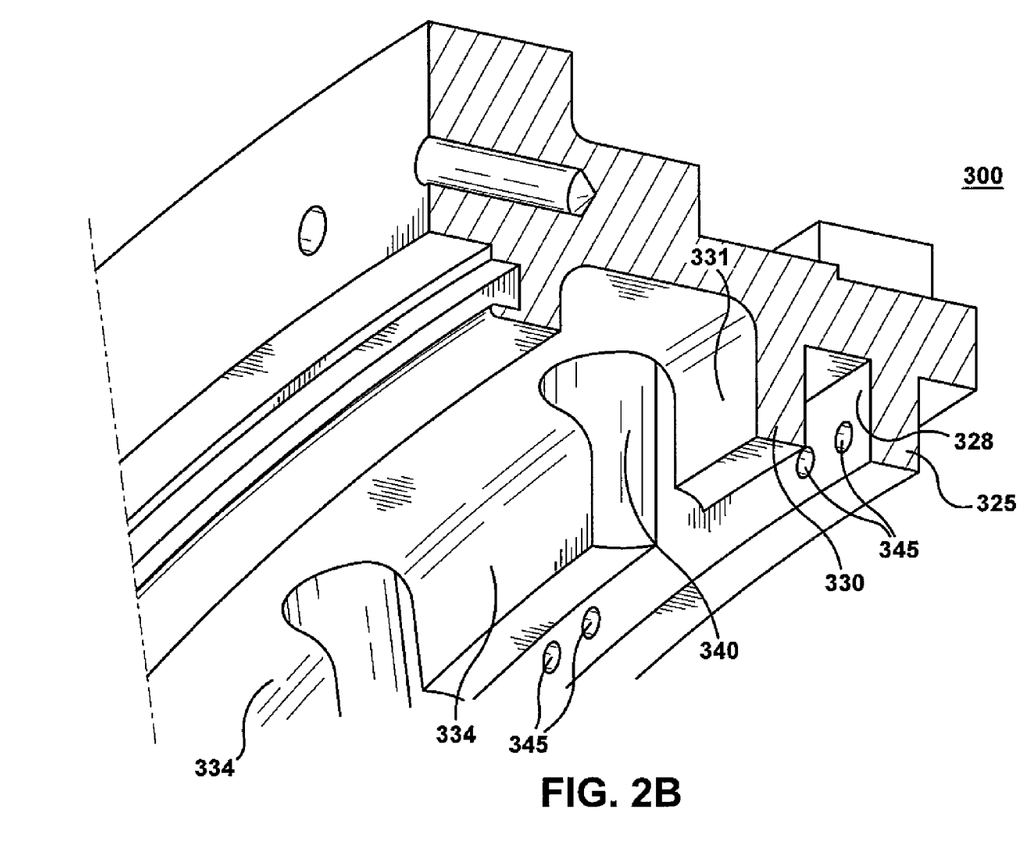

FIGS. 2A and 2B illustrate an isometric cross section of an embodiment of the retaining ring from an aft and a forward perspective, respectively. The retaining ring 300 includes a main body 310 of a generally cylindrical shape that is supported by the casing of the turbine by methods known in the art. Although not shown, the retaining ring is preferentially divided into two semi-circular rings to facilitate assembly. The main body 310 may include a pair of circumferential retaining lands 315 projecting inward radially to a depth of d from the main body 310. The pair of circumferential lands may be located on the aft side of retaining ring 300, each land being separated from each other axially by a predetermined distance w. The projection d from the main body 310 and the predetermined width w between the pair of circumferential lands 315 define a circumferential annular groove 320. The pair of circumferential retaining lands 315 may include and aft retaining land 325 and a forward retaining land 330. The aft retaining land 325 includes an aft circumferential face 326 and a forward circumferential face 328. The forward retaining land 330 includes a forward circumferential face 331 and an aft circumferential face 333. The forward retaining land 330 may optionally be interrupted along its circumferential length by a plurality of radial oriented cooling holes 340, thereby creating circumferential segments 334 in the forward retaining land 330. The cooling holes 340 provide a path for cooling air from outside the main body 310 of the retaining ring and meshing with an internal channel within the airfoil of the nozzle to cool the nozzle.

A plurality of axial-oriented through-holes 345 are provided between the aft circumferential face 326 and the forward circumferential face 328 of the aft retaining land 325. A plurality of axial-oriented closed-end bore holes 350 are provided through the aft face 333 of forward retaining land 330. The plurality of axial-oriented through-holes 345 in the aft retaining land 325 and the plurality of axial-oriented closed-end bore holes 350 in the forward retaining land 330 are radially and circumferentially organized coaxially 358 to accept a retention pin (not shown) axially through the aft retaining land 325 and into the bore hole 350 of the forward retaining land 330. The coaxially oriented holes 358 are further arranged circumferentially in pairs 360, equally spaced around the retaining lands. The circumferential arrangement of the paired holes 360, being key to the positive capture scheme of the retention pins, will later be described in greater detail. The diameter of the paired holes 360 are sized to accept retention pins for the nozzle.

Figure 3A:
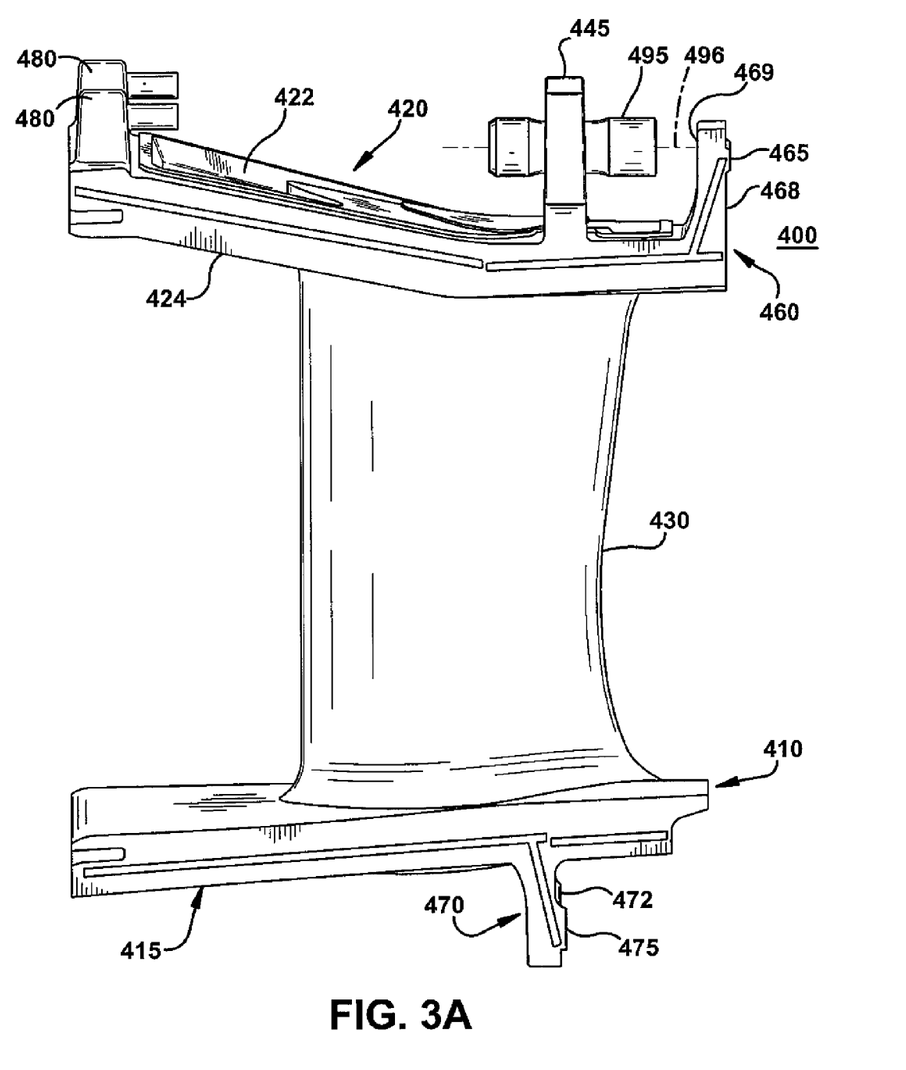
FIGS. 3A, 3B and 3C illustrate views of an embodiment of an inventive singlet first stage nozzle for the outer sidewall retention scheme.
Figure 3B:
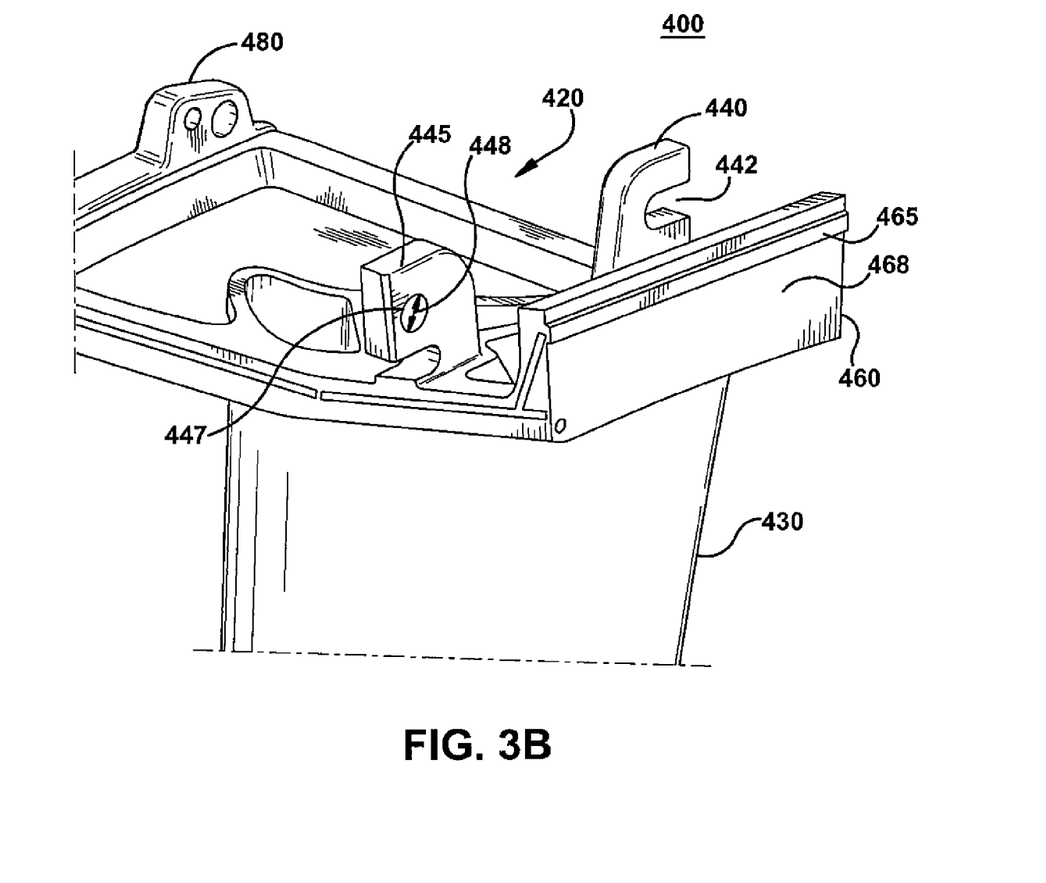
Figure 3C:
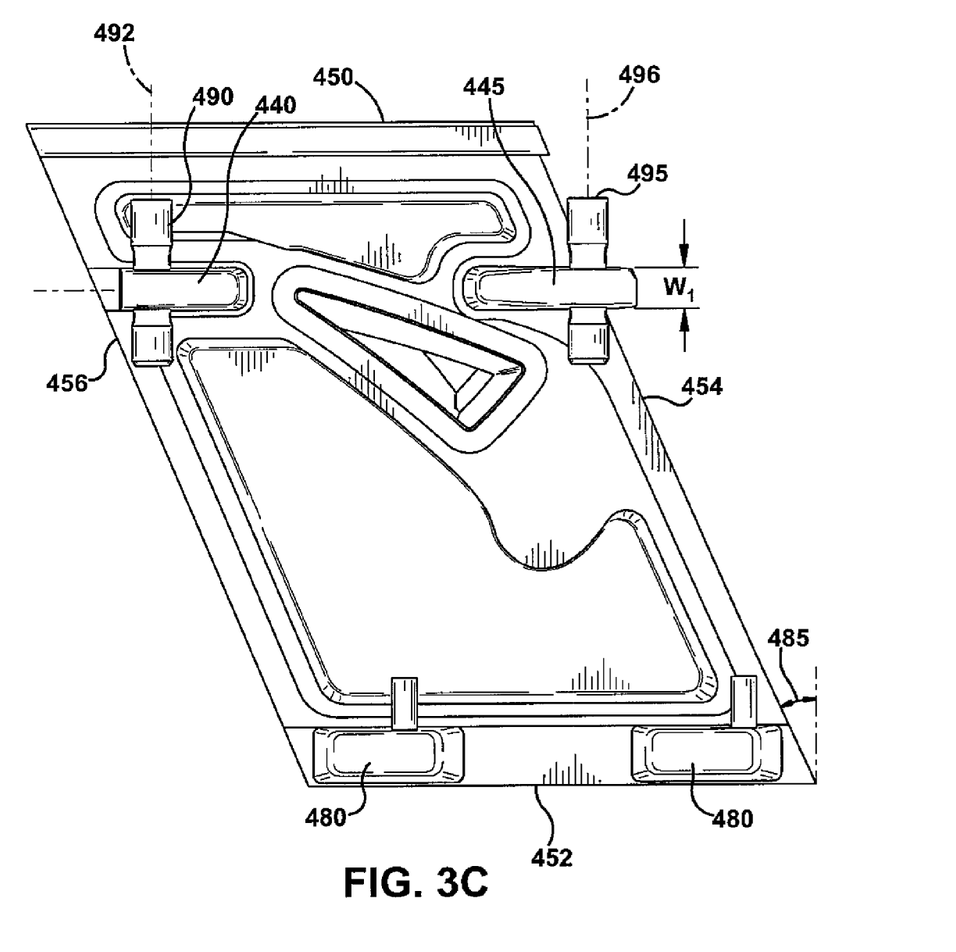

FIG. 3A illustrates a side view of an embodiment of a first stage nozzle in the outer sidewall retention scheme. FIG. 3B illustrates an isometric view of an outer surface of the outer sidewall of the first stage nozzle. FIG. 3C illustrates a top view of the outer surface of the outer sidewall of the first stage nozzle.

The first stage nozzle 400 includes an inner sidewall 410, an outer sidewall 420 and an airfoil 430 in-between. The airfoil 430 may include an internal cavity for nozzle cooling having an entrance aligned generally in axial and circumferential alignment with the air-cooling hole of the retaining ring. The outer sidewall 420 includes an outer face 422 and an inner face 424. With respect to orientation of the four sides of the nozzle sidewall, when in place on the retaining ring, an aft side is the downstream side and a forward side is the upstream side with respect to flow through the turbine. Further, the suction side is the clockwise side and the pressure side is the counterclockwise side when looking down the flow path from the combustor end.

The outer face 422 of the outer sidewall 420 includes two retaining lugs. A first lug 440 and a second lug 445 are positioned forward from the aft edge 450 of the sidewall by a predetermined distance s, the lugs being in axial alignment with respect to the aft end of the sidewall. The first lug 440 is positioned on the pressure side 456 of the sidewall. The second lug 445 is positioned on the suction side 454 of the sidewall. The first lug 440 and the second lug 445 are circumferentially positioned in proximity to the edge of their respective edge of the outer sidewall 420. The first lug 440 and the second lug 445 include a width $w_1$. $W_1$ is adapted to fit within the circumferential retaining groove (FIG. 2A, 320) of the pair of retaining lands when the nozzle is mounted on the retaining ring. The first lug 440 includes an axial oriented open-ended slot 442. The second lug 445 includes an axial-oriented closed pinhole 447. The closed pinhole 447 and the open-ended slot 442 are centered at a depth to align radially with the axis of the axially oriented set of holes in the retaining lands when the nozzle is mounted on the retaining ring. The closed pinhole 447 and the open slot 442 are sized to accept retention pins for the nozzle. The nozzle stability is maximized by placement of the lugs as far forward as possible and as far apart as possible to generate longer moment arms for reacting out gas loads. Moving the support lugs away from the trailing edge minimizes the stress input into the trailing edge.

The outer sidewall 420 further includes a chordal hinge rail 460 on the aft edge 450. The chordal hinge rail 460 runs from the inner face of the sidewall from the pressure side to the suction side and extends in a generally outward radial direction from the aft edge 450 of sidewall. The rail projects sufficiently outward radially to cover at least partially or fully the radial reach of the through-holes in the aft face of the aft retaining land. A chordal hinge seal 465 is provided on the aft surface 468 of the chordal hinge rail 460 for providing a seating surface against the shroud for first stage bucket. The chordal hinge seal 465 also provides axial support for the outer sidewall against the shroud. The axial support by the shroud for the outer sidewall complements radial and circumferential support provided by the retaining lands.

Referring to FIG. 3C, the top view of the outer sidewall illustrates that the sidewall carries the shape of a parallelogram with an sidewall skew angle 485 of about 23 degrees from the axial direction. The skewing results in the aft end 450 of the outer sidewall 420 (and hence the chordal hinge rail 460) is shifted circumferentially towards the pressure side 460 and away from the suction side 454 of the outer sidewall 420. With the first retention pin 490 in place in first retaining lug 440, axial insertion and removal along centerline line 492 of the first retention pin 490 is thus blocked by chordal hinge rail 460. However, centerline 496 of second retention pin 495 in second retaining lug 445 falls circumferentially outside chordal hinge rail 460. Placement of another nozzle on the retaining ring (not shown) adjacent to the second lug 445 will provide a portion of its chordal hinge to block backing out of pin 495.

Figure 4:
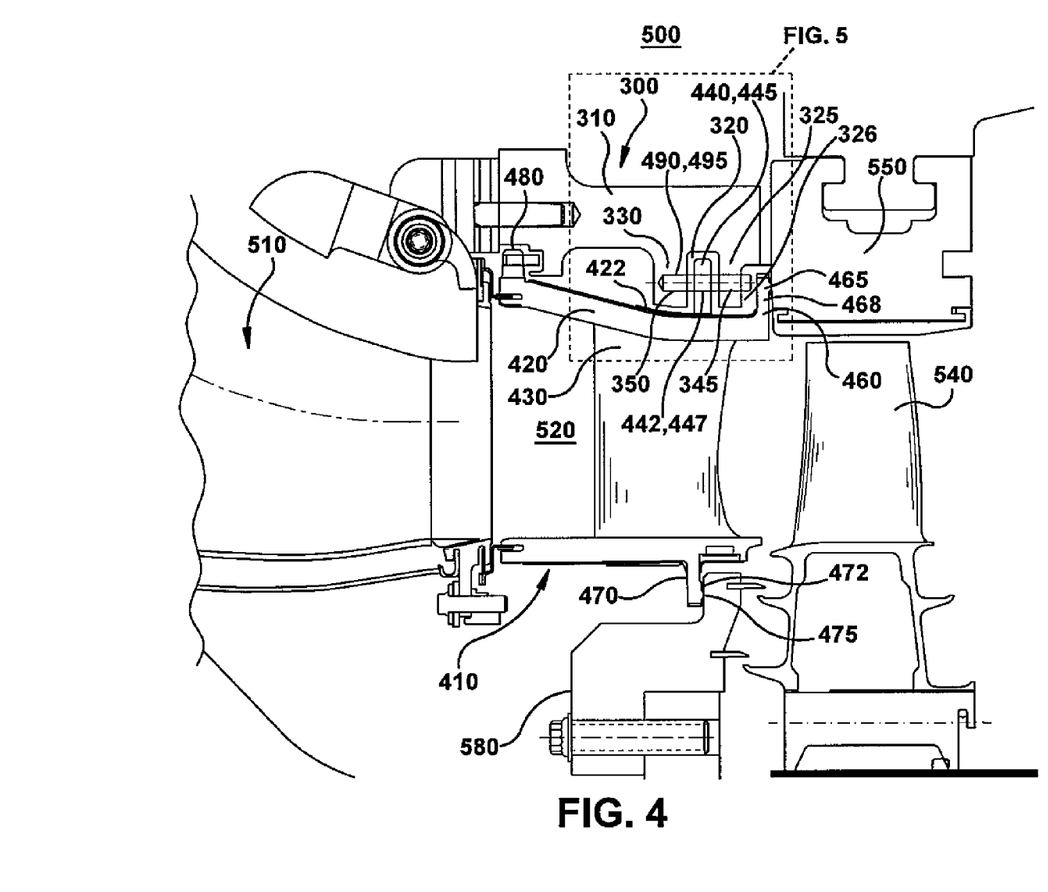
FIG. 4 illustrates a schematic side elevational view of the outer sidewall retention scheme.

FIG. 4 illustrates a schematic side elevational view of the outer sidewall retention scheme 500 for a first stage nozzle. Hot gases of combustion flow from a combustor (not shown) through transition piece 510. The hot gases enter the first stage nozzle 520, impinging on airfoil 430. The hot gases are directed by the airfoil 430 to the first stage bucket 540. The directing process performed by the nozzles also accelerates gas flow resulting in a static pressure reduction between inlet and outlet planes and high pressure loading of the nozzles. Retaining ring 300 includes forward circumferential land 330 and aft circumferential land 325. Retaining lugs 440, 445 (one shown) of the outer sidewall 420 for each first stage nozzle fit into annular groove 320. Retention pins 442, 447 (one shown) fit through axial holes 345 and 350 in the aft retailing land 325 and the forward retaining land 330, respectively. The retention pins 442, 447 provide radial and circumferential support for the first stage nozzle 520 through retaining lugs 440, 445. Chordal hinge rail 460 on the outer sidewall 420 provides axial support for the nozzle at the point of the chordal hinge seal 465 making contact with the shroud 550 for the first stage bucket 540. Chordal hinge rail 470 on the inner sidewall 410 provides axial support for the nozzle at the point of chordal hinge seal 475 making contact with the support ring 580. Retention pins 442, 447 (one shown) are prevented from backing out from the retaining lugs 440, 445 by chordal hinge rail 460.

The inventive retention pin was developed to accommodate the associated new dual-pin, outer diameter nozzle retention scheme. These pins allow for some axial translation of the turbine nozzles while securing their radial locations. The pin is also designed such that the nozzle will never disengage with the assembly, independent of the failure of any pin retention feature. The pins also allow for nozzle rotation (around one pin) during installation.

The pins allow the turbine nozzle to be thermally isolated from the retaining ring while still performing the retention capabilities (radial, circumferential) of the replaced hook feature. Establishing correct nozzle throat areas, as well as, securing nozzles from disengagement within the turbine are also resolved by this pin design.

Prior art design includes the use of pins only as an anti-rotation feature, in both the retaining ring and the nozzle.

The pin is unique to the retention scheme with respect to both dimensions and features and is critical to the functionality of the turbine assembly (2 per nozzle). The pins for each nozzle secure the radial and circumferential location of the nozzles as well as allow transitional motion. They also maintain minimal contact with both the nozzles and the retaining ring to significantly reduce conductive heat transfer from the nozzle to the retaining ring (the source of retaining ring out-of-roundness). By positioning the nozzles, they also set the desired nozzle throat areas for optimal turbine performance. The axial lengths for the pins have been optimized such that the nozzle cannot disengage within the assembly due to the pin backing out of its nominal axial position, and the pin has been designed such that the pin will not fail due to low cycle fatigue, creep, or yielding, all of which minimize nozzle fallout.

The pins guarantee no nozzle disengagement with the assembly based on its shape, size and material. Off-the-shelf pins would have to be machined to correct diameter as well as lengths to remotely achieve the same function. These pins also thermally isolate the retaining ring and will result in less repair of the retaining ring due to out-of-roundness. Any other length or shape will either hinder nozzle movement in a negative way or allow for nozzle disengagement. The retention pin has been analyzed in the worst-case scenario for yield stress, low cycle fatigue and creep failure using ANSYS, meeting all criteria set for the turbine assembly. The pin itself prevents nozzle disengagement due to its shape and size, while also maintaining the optimal nozzle position. The pin also has a cylindrical or spherical center shape that allows for nozzle rotation during installation, a feature that does not exist in today's turbines.

Figure 5:
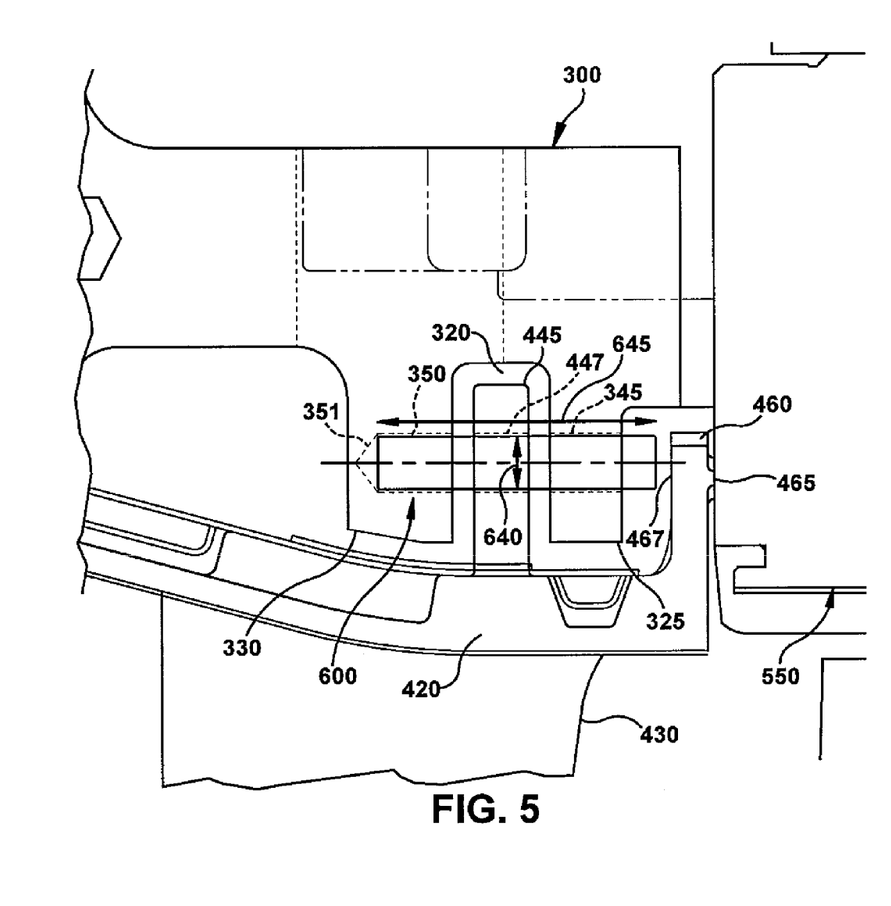
FIG. 5 provides an expanded view for an embodiment of the inventive pin connecting the retaining ring to the to the retaining lugs of the outer sidewall of a first stage nozzle.

FIG. 5 provides an expanded view for an embodiment of the inventive pin connecting the retaining ring to the retaining lugs of the outer sidewall of a first stage nozzle. Retaining ring 300 includes an aft retaining land 325 and a forward retaining land 330. The aft retaining land 325 includes a through-hole 345. The forward retaining land includes a closed-end hole 350. The outer sidewall 420 includes the first lug and the second lug, the second lug 445 being seen in this view and fitting within groove 320 of the retaining ring 300. Chordal hinge 460 includes inner surface 467 and chordal seal 465 sealing against shroud 550.

Retention pin 600 is shown installed and engaging the retaining ring 300 with the second lug 445 of the outer sidewall 420. An identical retention pin 490 engages the first lug 440 (see FIG. 3C) in a similar manner. One embodiment for a body 610 of the pin 610 may be cylindrical. Limited contact area between the cylindrical shape body 610 of the retention pin 600 and the lugs 440, 445 limits heat transfer from the hot sidewall 420 to the retaining ring 300. For the cylindrical pin body 610, a clearance is provided between the pin diameter 640 and the diameter 448 of pinhole 447 in lug 445 (FIG. 3B) to allow the nozzle to roll forward and aft during engine startup and shutdown. The pin includes a length 645.

Figures 6A, 6B:
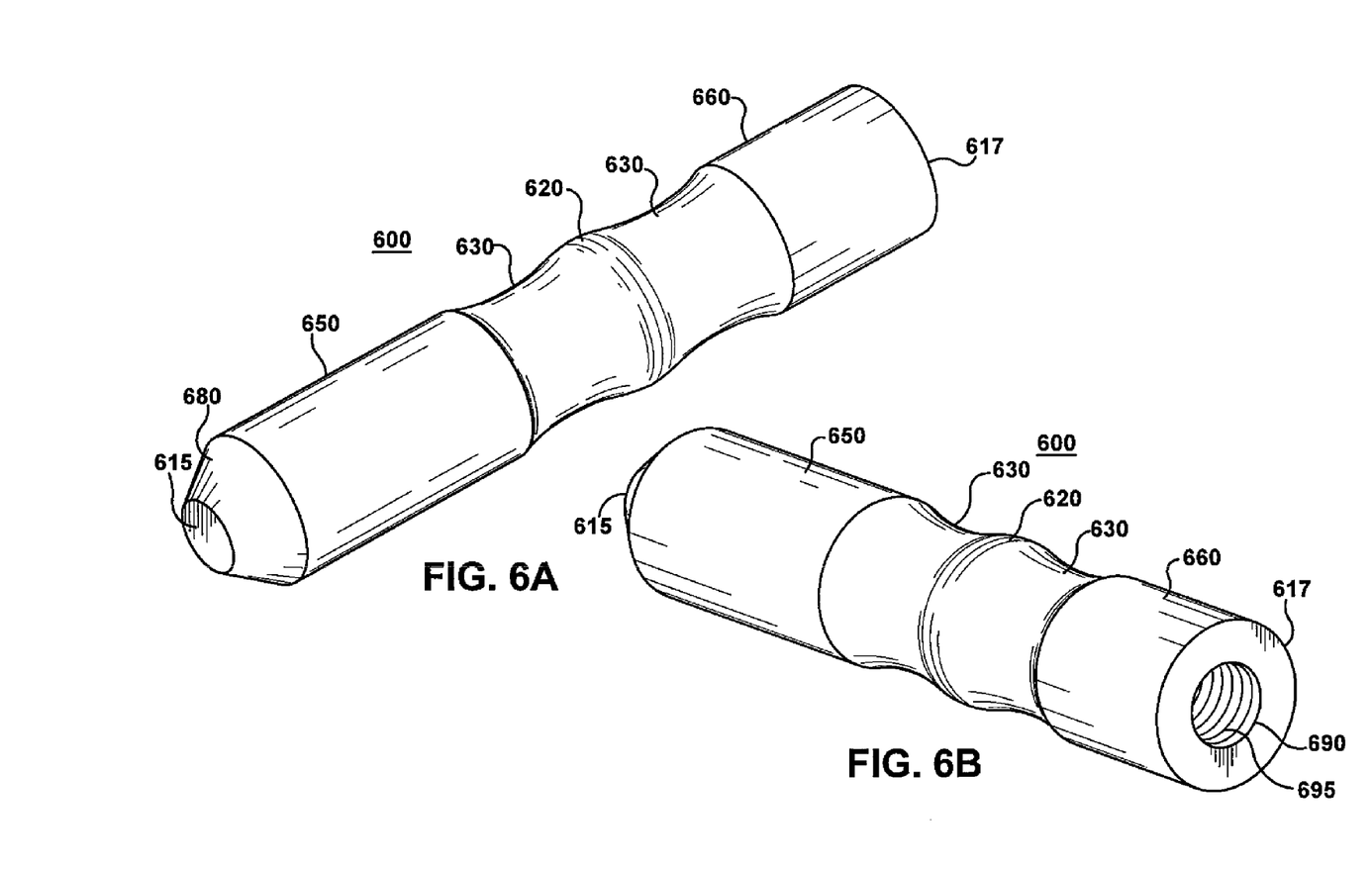
FIG. 6A illustrates a forward-end isometric view for an embodiment of the inventive retention pin with a spherical-centered shape.
FIG. 6B illustrates a tail-end isometric view for an embodiment of the inventive retention pin with a spherical-centered shape and a hole on the end face.

Another embodiment of the pin, illustrated in FIG. 6A and FIG. 6B, may include a generally cylindrical shape at a forward section 650 and an aft section 660 of the pin 600, with a spherical elevation 620 at the approximate midpoint of the pin extending circumferentially around the surface and spherical depressions 630 running circumferentially to each side of the spherical elevation 630. The spherical elevation 620 for the embodiment of the retention pin, particularly, limits the effective contact area between the retaining lugs 440, 445 (FIG. 3C) and the retaining ring, further limits heat transfer from the hot sidewall 420 to the retaining ring 300. The spherical-shaped elevation 620 further allows the nozzle to roll forward and aft during engine startup or shutdown.

The length of the pin 645 (FIG. 5) may include a design length about 2.700 in. with a tolerance of about +/−0.200 in. for the 7FA HGP gas turbine, by General Electric Co, however the pin may be scaled for other applications. The pin diameter has been optimized to approximately 0.500"+/−0.005", but is also scalable up or down for different engines. Tie pin 600 is sized to fit between the closed end 351 of closed-end hole 350 and the inner wall 467 of chordal hinge rail 460. Further the pin 600 is sized, such that if it were backed out to be in contact with the inner wall 467 of the chordal hinge 460, the pin 600 will still engage with closed-end hole 350 of the forward retaining land 330. The pin 600 is also sized to engage through-hole 345 in aft retaining land 325, when fully seated forward on the closed-end 351 of closed-end hole 350 of the forward retaining land.

At a front end of the pin, there is guiding means that allows for ease of assembly. Guiding means may be, for example, an actual chamfer, a simple break-edge, a radius, or something similar (that can vary in size and shape), but regardless will guide the pin into the hole during assembly.

At the tail end of the pin, engaging means may be provided. Engaging means may include a simple cylindrical end of the pin that would be engaged with pliers. However, other engaging means may be provided at the end of the pin to permit removal with other tool devices. Such engaging means may include, but are not limited to providing a through-hole in the cylindrical face at the tail end of the pin or parallel segmental slots in the tail end of the pin. One embodiment of engaging means is a tapped hole on the circular face at the tail end of the pin.

FIGS. 6A-6B illustrate a front-end and a tail-end isometric view for an embodiment of the inventive pin with a spherical-centered shape. The retention pin 600 includes a cylindrical forward section 650 and aft section 660. The front end 615 of the pin includes guiding means. A chamfer 680 is illustrated as an example of guiding means for the pin. Spherical center elevation 620 is centered between spherical depressions 630. Tail end 617 may include a cylindrical cavity 690 with internal threads 695.

Figures 7A, 7B:
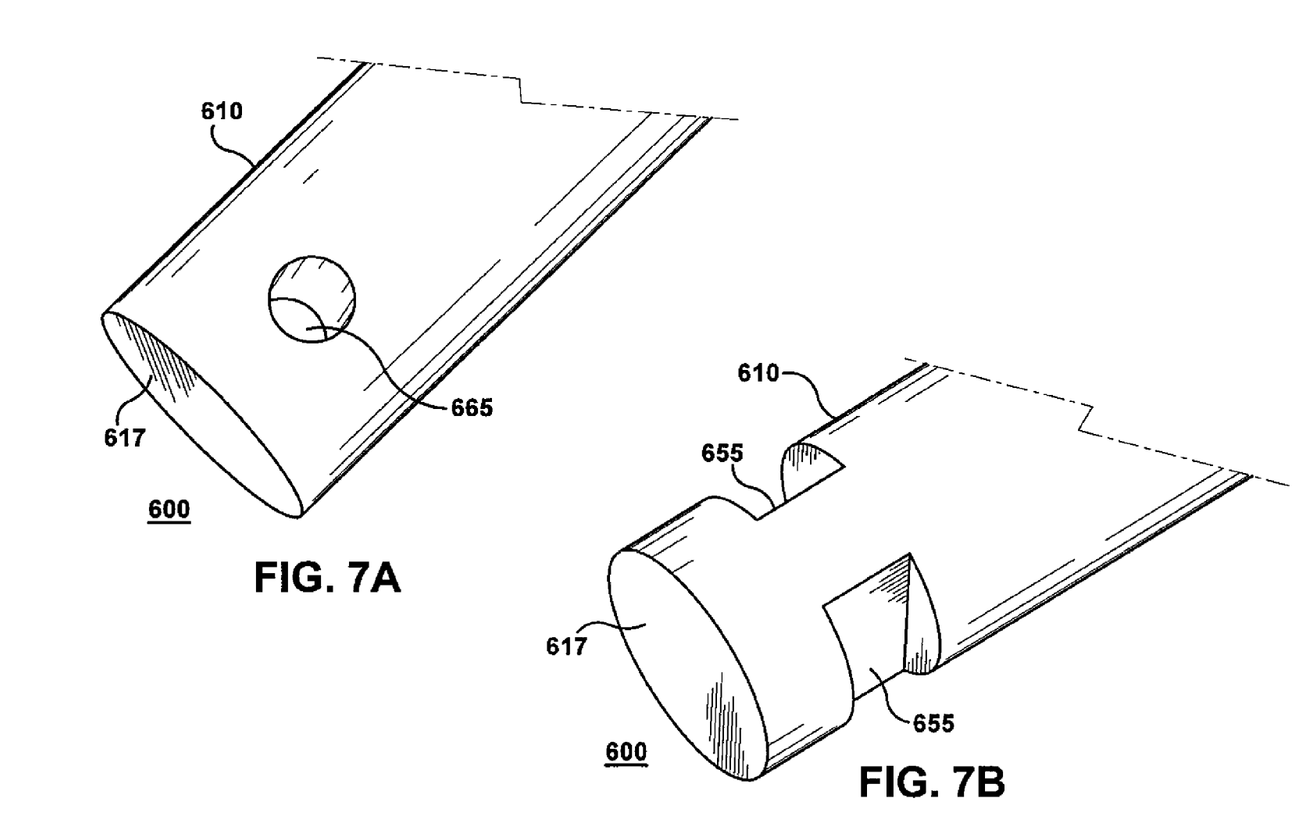
FIG. 7A illustrates a tail end for an embodiment of the inventive retention pin including a radial through hole for engaging a removal tool.
FIG. 7B illustrates a tail end for an embodiment of the inventive retention pin including axial segmented cuts for engaging a removal tool.

FIGS. 7A-7B illustrate alternate embodiments of tail-end engaging schemes for the inventive retention pin. FIG. 7A illustrates the tail-end 617 of the cylindrical body 610 of the retention pin 600. The cylindrical body 610 includes radial through-hole 665 for engagement with a tool to facilitate extraction of the installed pin. FIG. 7B illustrates the tail-end 617 of the cylindrical body of the retention pin 600. The cylindrical body 610 includes two parallel segment slots 655 for engagement with a removal tool.

A method is provided for fastening lugs of an outer sidewall, including a chordal hinge of a turbine nozzle, within a groove between a forward land and an aft land of a retaining ring through coaxial holes in the lugs and the lands. The steps include providing guiding means on a tip end of the retention pin; providing engaging means on the tail end of the retention pin; and inserting the retention pin through the coaxial holes of the aft land of the retaining ring, the lug of the sidewall and forward land of the retaining ring.

The step of inserting the pins through the coaxial holes of the retaining ring and the lugs may include providing a tool adapted to mate with engaging means on the tail end 617 of the pin 600 and mating the tool with engaging means on the pin.

In a method for removal of embodiments of the inventive pin, engaging means are provided at the tail end of the pin. Further, a tool is provided, adapted to mate with engaging means on the tail end of the pin. The tool may be as simple as a pair of pliers. The tool may include a hole punch-like tool that would fit into the through-hole 665 in the tail end 617 for one embodiment of the pin as shown in FIG. 7A. The tool may also include a pliers-like device to mate with the tail end engaging means that provides the parallel segmented slots 655 for another embodiment of the pin as shown in FIG. 7B. For a further embodiment of engaging means, the tool may include a threaded head end to engage with the threads 695 in cavity 690 in the tail end 617 of the pin 600 of FIG. 6B.

Attached to the threaded head of the tool, the tool may further include a slide-hammer or similar device to extract the pin.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A retention pin for fastening retaining lugs of an outer sidewall, including a chordal hinge rail, of a turbine nozzle, within a groove between a forward land and an aft land of a retaining ring wherein the retention pins fit through coaxial holes in the lug and the lands, the retention pin comprising:
   a generally cylindrical-shaped pin including an outer diameter adapted to fit through the coaxial holes in the lug and the lands and a length adapted to fit between a closed-end in the coaxial hole of the forward land and an inner wall of the chordal hinge rail.

2. The retention pin according to claim 1, wherein the length is at least sufficient to span a distance between the closed-end in the coaxial hole and the aft retaining land.

3. The retention pin according to claim 1, wherein the length is at least sufficient to span a distance between the inner wall of the chordal hinge and the forward retaining land.

4. The retention pin according to claim 1, wherein the pin is cylindrical shaped including an outer diameter being constant along the length of the pin and a clearance is provided between the pin diameter and the nozzle lug coaxial hole diameter to allow the nozzle to roll forward and aft during startup and shutdown.

5. The retention pin according to claim 1, wherein a contact surface at the center section of the pin is limited to minimize heat transfer between the nozzle lug and retaining ring through the pin.

6. The retention pin according to claim 5, wherein the outer diameter contact surface includes a spherical-shaped elevation at the center of its length bounded by spherical depressions on each side of the spherical-shaped elevation to allow the nozzle to roll forward and aft during engine startup and shutdown, the spherical shaped elevation limited radially to the outer diameter of the pin.

7. The retention pin according to claim 6, wherein the length of the spherical-shaped elevation comprises: an axial length along the pin smaller than a width of the lug.

8. The retention pin according to claim 7, wherein the combined length of the spherical-shaped elevation and the spherical-shaped depressions comprises:
   an axial length along the pin approximately equal to width of the groove in the retaining ring.

9. The retention pin according to claim 1, further comprising:
   a tip end including guiding means for ease of insertion into the coaxial holes.

10. The retention pin according to claim 9, guiding means further comprising:
    at least one of a chamfer, a break-edge, and a radius on the tip end of the pin.

11. The retention pin according to claim 1, further comprising:
    a tail end, including engaging means for facilitating withdrawal of the retention pin from the coaxial holes.

12. The retention pin according to claim 11, wherein engaging means is located in a portion of the tail end extending between the aft land and the chordal seal, when the pin is seated at the closed end of the coaxial hole in the forward land.

13. The retention pin according to claim 11, engaging means comprising:
    at least one of a through-hole and slots in a cylindrical face of the pin.

14. The retention pin according to claim 11, engaging means comprising:
    a tapped hole in the tail end of the pin.

15. A method for fastening lugs of an outer sidewall, including a chordal hinge of a turbine nozzle, within a groove between a forward land and an aft land of a retaining ring through coaxial holes in the lugs and the lands, the method comprising:
    providing guiding means on a tip end of the retention pin;
    providing engaging means on the tail end of the retention pin;
    inserting the retention pin through the coaxial holes of the aft land of the retaining ring, the lug of the sidewall and forward land of the retaining ring; and
    seating the retention pin on the closed-end of the coaxial hole in the forward land of the retaining ring.

16. The method for fastening lugs of an outer sidewall according to claim 15, the step of providing engaging means comprising:
    providing at least one of a through-hole and slots in a cylindrical face of the pin at the tail-end.

17. The method for fastening lugs of an outer sidewall according to claim 15, the step of providing engaging means comprising:
    providing a tapped hole at the tail-end.

18. The method for fastening lugs of an outer sidewall according to claim 16, the step of inserting the retention pin through the coaxial holes comprising:
    providing a tool adapted to engage the engaging means on the tail end of the pin;
    engaging the tail end of the pin with the tool;
    inserting guiding means on the tip of the pin into the coaxial hole of the aft land;
    inserting guiding means on the tip of the pin into the coaxial hole of the lug; and
    inserting guiding means on the tip of the pin into the coaxial hole of the forward land.

19. The method for fastening lugs of an outer sidewall according to claim 16, the step of providing a tool adapted to engaging means comprising:
    providing at least one of a tool including a punch projection to engage the through-hole in the cylindrical face, a double-slot engaging tool, and a slide hammer.

20. The method for fastening lugs of an outer sidewall according to claim 15, further comprising:
    engaging the tail end of the pin with the tool; and
    operating the tool remove the pin from the coaxial holes when the lugs are to be detached from the outer sidewall.

21. The method for fastening lugs of an outer sidewall according to claim 15, further comprising:
    providing a retention pin of axial length that will not back out of its nominal axial position and will not fail due to low cycle fatigue, creep, or yielding.

* * * * *